United States Patent [19]

Anspon

[11] 4,312,802
[45] Jan. 26, 1982

[54] POLYMER COMPOSITIONS AND ARTICLES THEREFROM

[75] Inventor: Harry D. Anspon, Sewickley, Pa.

[73] Assignee: United States Steel Corporation, Pittsburgh, Pa.

[21] Appl. No.: 829,411

[22] Filed: Aug. 31, 1977

[51] Int. Cl.³ ............................................. C08K 5/01
[52] U.S. Cl. .................. 260/33.6 AQ; 260/31.2 MR; 260/31.8 DR
[58] Field of Search .................. 260/880 R, 33.6 AQ, 260/31.2 MR, 31.8 DR

[56] References Cited

U.S. PATENT DOCUMENTS

| 3,177,168 | 4/1965 | Lunk | 260/880 R |
|---|---|---|---|
| 3,193,518 | 7/1965 | Lunk | 260/880 R |
| 3,213,159 | 10/1965 | Adomaitis | 260/880 R |
| 3,718,616 | 2/1973 | Muirhead | 260/880 R |
| 3,929,936 | 12/1975 | Davies | 260/880 B |
| 3,976,721 | 8/1976 | Satake | 260/880 R |
| 3,989,771 | 11/1976 | Reith | 260/880 R |
| 4,026,969 | 5/1977 | Mostert | 260/880 R |

FOREIGN PATENT DOCUMENTS

| 963307 | 7/1964 | United Kingdom . |
|---|---|---|
| 998772 | 7/1965 | United Kingdom . |

*Primary Examiner*—Paul R. Michl
*Attorney, Agent, or Firm*—William L. Krayer

[57] ABSTRACT

Impact polystyrene resin compositions and articles fabricated from them are prepared from styrene and a polybutadiene rubber having a vinyl isomer content of 11 to 22 percent.

1 Claim, No Drawings

POLYMER COMPOSITIONS AND ARTICLES THEREFROM

BACKGROUND OF THE INVENTION

Packaging is a major area for use and comsumption of impact polystyrene resins. These resins are fabricated into cups, tubs, bowls, trays and similar articles by deep draw thermoforming or high-speed injection molding. For such service, it is desired that the impact polystyrene resins have melt toughness or resistance to thinning in cross section while being formed in the molten state as well as satisfactory general molding and physical property characteristics. Also, it is advantageous to have impact polystyrene resins that with minor changes in the polymerization recipe for the resin can be used for injection molding and extrusion or extrusion alone.

By the present invention, impact polystyrene resins as well as articles are provided which satisfy these objectives.

SUMMARY OF THE INVENTION

The resin compositions of this invention are impact polystyrenes made from styrene and a polybutadiene rubber which has a vinyl isomer content in the range of 11 to 22 percent. The resin compositions have satisfactory elongation, tensile strength and impact strength along with melt toughness and chemical resistance. Articles can be fabricated by deep draw thermoforming or by injection molding. The initial polymerization is conducted under thermal conditions and in the presence of small amounts of very active free radical terminators.

DESCRIPTION OF PREFERRED EMBODIMENT

The impact polystyrene resins to which this invention is directed are those in which there is a matrix of polymerized styrene containing a dispersed phase of small insoluble particles. These particles in turn have a matrix of polybutadiene rubber containing another dispersed phase of polymerized styrene. Between the gross matrix of polymerized styrene and the dispersed insoluble particles there are graft copolymer linkages of styrene-polybutadiene; these linkages are relatively few per unit weight of insoluble particles. In the individual particle, there is also cross-linked polybutadiene rubber, styrene homopolymer and graft copolymer linkages formed between the rubber and the dispersed polystyrene phase. The overall weight ratio of polybutadiene rubber is in the range of about 4 to about 10% of the total weight of rubber and styrene.

The impact polystyrene resins are characterized by a combination of chemical, physical and optical analyses. The chemical properties are molecular weight of the polymerized styrene matrix, the percent insoluble material in the resin (% insolubles), the percent grafting of the styrene (% grafting) and the ratio of swollen insoluble material to dry insoluble material (Swelling Index). Optical analyses include microphotography to determine the presence of discrete insoluble particles and the average particle size of the particles (Resin Particle Size, RPS). In the resins of this invention, the Swelling Index measured as weight ratio is in the range of 5.0 to 30.0; the resin particle size is in the range of 1-10 microns.

The polymerized styrene matrix will have a number average molecular weight in the range of about 70,000 to 120,000. The percent insolubles, including crosslinked polybutadiene, and graft copolymer between styrene and polybutadiene and occluded polystyrene will be in the range of 10 to 20%. The percentage grafting will be in the range of 10 to 20%.

Chemical resistance is a measure of the effect of vegetable oils or fats on the impact polystyrene resin; it is expressed in terms of minutes before failure of a stressed sample of resin that is coated with hydrogenated vegetable oil. It is intended to predict behavior of the resin when used as a packaging material in contact with food products such as margarine, cottage cheese, mayonnaise or mustard. These resins have a chemical resistance of at least 29 minutes. As the vinyl content of the polybutadiene rubber increases, the resistance of the resins increases to 35-60 minutes.

The physical properties of resin samples are measured by conventional test methods. These are taken to reflect the expected performance of the resin during fabrication and while in service as a molded plastic article. These also are a measure of the effectiveness of the polybutadiene rubber and the dispersed insoluble particles in modifying the properties of the polymerized styrene matrix. The principal resin properties measured are Vicat softening temperature, melt index, elongation at failure, tensile strength at yield, tensile strength at failure or break, and impact toughness in terms of impact strength. For the resins of this invention, the Vicat temperature will be at least 214° F. Melt index is a parameter for injection molding and extrusion performance; extrusion resin grades will have an MI of up to 2.5 gm/10 sec.; grades for either injection or extrusion will have an MI of up to 4.0 gm/10 sec.

The magnitude of values for elongation, tensile strength and impact strength depend in part on the form of resin from which samples are made. As resin is converted from fine beads to extruded pellets and from pellets to extruded sheets, the absolute values change. The sheet forms are also affected by orientation effects on resin molecules from the direction of extrusion. Tensile strength at failure and elongation at failure for the samples from extruded sheets should be in the ranges of at least 2000 psi and at least 35%, respectively. The corresponding Izod impact strength should be at least 0.9 ft./lb./in. The direction of changes in values of elongation at failure and Izod impact strength between bead, pellet and sheet samples should be consistent. Orientation effects as shown by sheet samples from the direction of extrusion and perpendicular to the direction of extrusion should be minimized; the variation in values between samples from the respective directions will be no more than about 30% below the larger value. Especially desirable resins are those in which the difference in values is 20% or less. As can be seen from the description given hereafter, it is possible to achieve a difference of less than 10% for the values of elongation at failure and tensile strength at failure with the difference in Izod impact values being less than 20%.

The performance of the resins during fabrication is affected by the particular polymerization recipe, conditions for polymerization of the recipe and the processing additives used with the resin. Typical operating conditions for extrusion are melt temperatures of about 400°–500° F., pressures of 1000-2500 psi, sheet gages of about 0.03 to 0.12 inches. The flow characteristics of the resins will be a combination of flow rate and melt viscosity so that the resin flows at an acceptable rate and produces sheet of uniform gage. This is indicated by the melt index and Vicat softening point. A feature of the resins of this invention is that the physical properties of recycled resin are substantially the same for a first, second, third or even fourth or more recycle. An additional feature is that the resins resist thinning when extruded sheet is further subjected to deep draw thermoforming. This means that as the extruded sheet is heated and subjected to forming against a die, the cross-sectional thickness of the molded article is uniform which avoids weakened sidewalls. The combination of isotropic sheet properties, satisfactory performance from recycled (commonly called regrind) resins and deep-draw formability along with other physical properties at least equivalent to conventional impact polystyrene resins is a unique feature of this invention. Another feature is that with minor changes in the basic polymerization recipe for extrusion grade resins, resins can be made to have sufficiently high melt flow rates, elongation at yield and impact toughness so that they can be used for both injection molding or extrusion.

The impact polystyrene resins of this invention are prepared by dissolving polybutadiene rubber in styrene monomer and conducting a first polymerization under thermal conditions while stirring the mixture of styrene and rubber. The polymerization is then continued until substantial completion. The reactions are conducted under an inert atmosphere. Peroxide catalysts, and an aqueous suspension system are used in the latter phase of polymerization. The polymerization procedure and temperatures are selected to be effective for producing the resins in the presence of polymerization inhibitors present as antioxidants or stabilizers in the various raw materials.

It has been found that the above resins can be made if during the polymerization there are present small amounts, on the order of up to 10 ppm, of very active free radical terminators of the quinone and quinone-imine types. During the initial stage of polymerization of the styrene and the polybutadiene, these are effective where the polymerization is conducted under conditions that utilize primarily secondary free radicals rather than primary free radicals. In general the very active quinone and quinone-imine free radical terminators are characterized by the following structures:

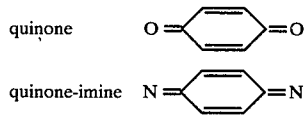

Alkyl or aryl substituted members have deep coloration, usually yellow or yellow/red. The effective concentration of the quinone and quinone-imine compounds is about 0.1–10 ppm by weight of the polybutadiene rubber. While each may be used separately, combinations of the two types are also effective.

The quinone and quinone-imine compounds should be non-volatile under the conditions of polymerization. The quinone compounds may have at least two ketone groups as an integral part of an aromatic ring, e.g., benzoquinone or anthraquinone, or may have at least one aromatic ring which has an integral ketone group and which is further substituted by groups to form a completely conjugated unsaturated system, e.g., stilbene quinone or a quinone alkide. In the case of a bridging unsaturated group between aromatic rings, it is preferably aliphatic, e.g., alkylidenyl. The aromatic rings may be further substituted by one or more alkyl, acyl, amino, halo, carboxyl or hydroxy radicals. The quinone structure can be in the leuco form as well as the ketone form. Examplary members are: benzoquinone; 1,4 benzoquinone; anthraquinone; 1,4 diamino anthraquinone; 1,5 diamino anthraquinone; 1-amino; 4-hydroxy aminoanthraquinone; 3,5,3',5' tetra (t-butyl) stilbene quinone; 2,5 cyclohexadiene 1,4 diamine.

A principal advantage in using the quinone and quinone-imine in the form of their compounds rather than in the form of precursors is to substantially reduce the total concentration of such compounds in the final impact resin polymer. Although the quinone and quinone-imines may be highly colored, the polymer product does not exhibit this coloration unless excessive concentrations are used.

Ordinarily, the quinones and quinone-imines are formed in situ during the polymerization from hydroxy aromatic and amino-aromatic compounds that are present as antioxidants in the raw materials; principal sources are the styrene monomer, the polybutadiene rubber and the plasticizer. The hydroxy aromatic compounds may also contain hydroxy, carboxyl, carbonyl, nitro, amino, aminoalkyl, alkylamino, alkyl, alkenyl, alkoxy and alkacyl groups. The hydroxy aromatic member may be selected from:

2,6,-di (tert butyl)-4-methyl phenol (butylated hydroxy toluene)
2,6,-di (tert butyl)-4-ethyl phenol
parahydroxybenzaldehyde
hydroquinone monomethyl ether
p-amino phenol
2,6-diisopropyl phenol
3,5-ditertiarybutyl-4-hydroxy benzyl ether
1,3,5-trimethyl-2,4,6-tris(3,5-ditertiarybutyl-4 hydroxy benzyl) benzene
2,6-dioctadecyl-paracresol
2 tertiary butyl hydroxy anisole
4-hydroxymethyl-2,6-ditertiarybutyl phenol
4-tertiary-butyl pyrocatechol
2,5-ditertiaryamyl hydroquinone
2,2'-ethylenebis (4-methyl-6-tertiarybutyl phenol)
4,4'-methylenebis (6-tertiarybutyl-ortho-cresol)
4,4'-methylenebis (2,6-ditertiarybutyl phenol).

The amino aromatic compound is preferably a substituted phenylene diamine. Exemplary compounds are:
N,N'-Bis(1,4-dimethylpentyl)-p-phenylenediamine
N,N'-Bis(1-ethyl-3-methylpentyl)-p-phenylenediamine
N,N'-Bis(1-methylheptyl)-p-phenylenediamine
N-sec-butyl-N'-phenyl-p-phenylenediamine
N-Cyclohexyl-N'-phenyl-p-phenylenediamine
Diarylarylenediamines, mixed
Diaryl-p-phenylenediamine
N,N'-Dicyclohexyl-p-phenylenediamine
N-(1,3-Dimethylbutyl)-N'-phenyl-p-phenylenediamine
N,N'-Di-2-naphthyl-p-phenylenediamine
N,N'-diphenyl-p-phenylenediamine
N-Isopropyl-N'-phenyl-p-phenylenediamine
N-(1-methylpentyl)-N'-phenyl-p-phenylenediamine
N-Phenyl-N'-2-octyl-p-phenylenediamine.

Many of these hydroxy aromatics will tend to dimerize during heating for polymerization. The intermediate dimer in turn reacts to form the quinone. For example, in the case of the 2,6-di(tertbutyl)-4-methyl phenol, about 1% will convert to the dimer and about 1% of the dimer will form the quinone. The aromatic amines can be converted to quinone imines. Typically the total aromatic hydroxy compounds will be present in amounts of about 2500 ppm in the polybutadiene rubber and about 25 ppm in the styrene and plasticizer. Aromatic diamines will be present in amounts of about 100 ppm of the polybutadiene rubber. Thus during polymerization, both the aromatic hydroxy compound and the aromatic diamines are present together.

The styrene monomer will normally contain inhibitors to prevent autopolymerization during storage; the amount and type may vary. Para t-butyl catchecol at 10-15 ppm of styrene has been found satisfactory. Excess inhibitor tends to give a yellow coloration to the resin product, which desirably will be white.

The polybutadiene rubber may be formed by polymerization of butadiene with complexed organo lithium catalysts in the presence of promoters and hydrocarbon solvents. Typically, complexed butyl lithium compounds are used for the polymerizations which yield a polybutadiene rubber having 11 to 22% vinyl content. Conditions for polymerizations of this type are described by Advances in Chemistry Series 130, Chapter 7. These rubbers are available in a variety of viscosities; usually, the viscosity range will be about 80 to about 200 centistokes for 5% styrene solutions measured at 25° C. The corresponding number average molecular weights are in the range of 60,000 to 110,000. The polymerized butadiene is in the form of isomeric cis, trans and vinyl structures. The preferred method of analysis for the percentage by weight of vinyl in the total cis, trans and vinyl structures is 220 MHz NMR. The concentration of cis isomer should be in the range of 30-45% and the trans isomer should be in the range of 40-60%; the trans concentration should also be such that it is the result of X-(% vinyl+% cis), where X is the total concentration of cis, trans and vinyl isomer units (generally X is considered equal to 100).

While the aforesaid polybutadiene rubber will usually be the sole rubbery material used in the polymerization with styrene, in some instances it is useful to have other rubbers as well. For example, polybutadiene rubbers conventionally used for making impact polystyrene resins (see U.S. Pat. Nos. 3,868,434 and 3,929,936), having about 7 to 10% vinyl content and about 35% cis content can be used in up to 50% by weight of the total rubbers present where it is desired to have an impact polystyrene resin with greater melt flow and less melt toughness. Likewise, minor amounts of styrene-butadiene block copolymer rubbers can be present to impart increased glossiness to the impact polystyrene resins without substantial loss of chemical resistance.

High boiling plasticizers are incorporated into the impact polystyrene resin. These improve flowability of the resin and also improve elongation at yield. The plasticizer will be an inert organic compound and will have an initial boiling point in the range of 500° F. Preferably, it will have no substantial volatilization below 600° F. The viscosity will be in the range of 300-440 SSU at 100° F. Typical members are alicyclic and paraffinic hydrocarbon oils, alicyclic and aliphatic esters of long chain fatty acids, e.g. butyl stearate; low molecular weight olefin polymers, e.g., polyethylene oils, polybutylene oils, and poly (ethylene alkyl acrylate) copolymer oils. These are generally used in amounts of 0.5 to 2% by weight of the impact polystyrene resin. A hydrocarbon oil that has been found effective is composed of about 20-50% napthenic carbon atoms and about 70-50% paraffinic carbons with less than 10% aromatic carbons; it has a viscosity of 335 SSU at 100° F.

The initial thermal polymerization of the styrene and polybutadiene rubber is conducted at temperatures from about 220° F. up to about 250° F. During this polymerization, the initial solution of styrene and rubber undergoes a phase inversion by which the styrene-polystyrene material becomes the continuous phase with small droplets of styrene-rubber phase material as the dispersed phase. Agitation during this stage of polymerization affects the size of the dispersed insoluble particles in the final resin. This size is controlled to give the optimum gloss and impact strength; weight average particle sizes of 2 to 6 microns are particularly desirable. The thermal polymerization proceeds principally by the formation of secondary free radicals rather then primary free radicals.

Once the polymerization reaches a viscosity of about 3,000 centipoises, the system can be suspended in water with the use of suspension agents. This region will generally permit the polymerization to be conducted without excessive risks of premature gelation and blockage of the reactors. Calcium phosphate in combination with an alkali metal salt of an alcohol ester sulfate is typical of such suspension agents. The polymerization is continued at temperatures of up to about 270° F. until the residual monomer level is less than 0.3% by weight of resin. An advantage of the polymerization with the aqueous suspension is that the polymerizing mixture is in the form of small droplets surrounded by water as a heat transfer medium. The viscosity of the suspension remains essentially constant while it is agitated during this latter stage of polymerization. This is especially desirable for the polymerization of styrene with the polybutadienes having 11-22% vinyl because very high viscosities in the polymerizing mixture may arise if occasional excess temperatures are encountered. Once the suspension is formed, oil soluble organic peroxide catalysts are added to promote graft polymerization between the rubbers and styrene and to cause the polymerization to go to completion. Catalyst addition at this time has the further benefit that the presence of the water phase in the reactor allows the viscosity of the organic phase to be increased substantially while the total mass is agitated. The water phase contains the dispersed organic phase and permits agitation at relatively low viscosity.

The following examples illustrate the practice of the invention.

EXAMPLES

A solution is made by dissolving approximately 6 parts of polybutadiene rubber in 100 parts of styrene monomer. The solution is stirred and the polymerization conducted at 250° F. (121° C.) until approximately 30% conversion.

A high boiling hydrocarbon oil plasticizer is added. This oil has an initial boiling point of at least 600° F., a viscosity of about 350 SSU and has about 60% paraffinic carbon atoms, 40% naphthenic carbon atoms and less than 2% aromatic carbon atoms. It also contains a small amount of an oxidation inhibitor, a-tocopherol. Thereafter, the polymerizing mixture is suspended in water with a suspension system of calcium phosphate and a sodium salt of an alcohol sulfonate as a surfactant. A t-butyl perbenzoate peroxide catalyst is added and the polymerization is continued at 230° F. (110° C.) while the suspension is stirred. Toward the end of polymerization, the temperature is increased to 270° F. (132° C.) until polymerization is complete, e.g., 0.3% or less of residual volatiles. The polymerization is conducted under an inert nitrogen atmosphere.

Fine beads of polymer are recovered from the suspension. These are extruded and cut into pellets. The pellets are then injection molded or extruded into thin sheets.

The polystyrene resin composition also contains processing additives and stabilizers, e.g., stearic acid, to adjust the physical properties of the resin product. The products shown as "A" are formulated to give a resin product particularly for extrusion application; it has a low gloss finish. The products shown as "B" are formulated to give a resin product that can be used for both extrusion and injection molding applications; it has a high gloss finish.

Resin A used a polybutadiene rubber having an ML-4 viscosity of 55; Resin B used a polybutadiene rubber having an ML-4 viscosity of 35.

The microstructure of the rubber is reported as "% vinyl", percent vinyl. This is the content of 1,2 addition forms by weight in the total butadiene stereoisomer content of the polybutadiene rubber. This has been calculated by 220 MHz NMR studies of the rubbers used in the Examples. Other analytical techniques can be used if values so obtained are adjusted to compensate for changes in instrumentation and procedure.

Analysis of the impact polystyrene resins produced in accordance with the examples are described in the following Tables I, II, and III.

TABLE II

Recycled Materials
Resin Series A, Re-Extruded Sheets

| Resin | Physical Property | | 1st Re-cycle | 2nd Re-cycle | 3rd Re-cycle | 4th Re-cycle |
|---|---|---|---|---|---|---|
| A-3 | Tensile @ | MD | 3430 | 3480 | 3370 | 3430 |
| 12.8% | Yield | AMD | 3490 | 3590 | 3460 | 3550 |
| Vinyl | Tensile @ | MD | 3200 | 3280 | 3120 | 3230 |
| | Failure | AMD | 3130 | 3250 | 3060 | 3270 |
| | Elongation @ | MD | 47 | 49 | 45 | 45 |
| | Failure | AMD | 50 | 55 | 43 | 51 |
| | Izod | MD | 1.5 | 1.5 | 1.6 | 1.6 |
| | Impact | AMD | 1.4 | 1.4 | 1.5 | 1.5 |
| A-6 | Tensile @ | MD | 3420 | 3400 | 3410 | 3510 |
| 20.6% | Yield | AMD | 3420 | 3440 | 3550 | 3520 |
| Vinyl | Tensile @ | MD | 4240 | 4200 | 4240 | 4230 |
| | Failure | AMD | 4300 | 4310 | 4340 | 4280 |
| | Elongation @ | MD | 41 | 41 | 40 | 41 |
| | Failure | AMD | 43 | 41 | 47 | 45 |
| | Izod | MD | 1.5 | 1.4 | 1.4 | 1.4 |
| | Impact | AMD | 1.2 | 1.1 | 1.0 | 1.1 |
| A-8 | Tensile @ | MD | 3600 | 3700 | 3600 | 3700 |
| 9.6% | Yield | AMD | 3700 | 3700 | 3800 | 3800 |
| Vinyl | Tensile @ | MD | 3200 | 3300 | 3200 | 3300 |
| | Failure | AMD | 3200 | 3200 | 3200 | 3300 |
| | Elongation @ | MD | 57 | 55 | 48 | 51 |
| | Failure | AMD | 55 | 58 | 56 | 56 |
| | Izod | MD | 1.6 | 1.5 | 1.5 | 1.5 |
| | Impact | AMD | 1.5 | 1.5 | 1.5 | 1.5 |

TABLE I

Resin Series A
5.66% Rubber

| Resin | % Vinyl | Flow Rate g/10 min. | Vicat °F. | Tensile @ Yield psi | Tensile @ Failure psi | Elongation @ Failure % | Izod Impact, Ft-Lb/In. Room Temp., Notched .125 Thick Samples | RPS Microns Wgt. Avg. | Swelling Index Dry Weights |
|---|---|---|---|---|---|---|---|---|---|
| A-1 | 11.7 | 2.6 | 216 | B-4580 | B-4390 | B-47 | B-2.6 | 3.8 | |
| | | | | P-4480 | P-4345 | P-52 | P-2.5 | | |
| | | | | $^S$MD-3590 | $^S$MD-3090 | $^S$MD-55 | $^S$MD-1.6 | | |
| | | | | AMD-3730 | AMD-2830 | AMD-35 | AMD-1.6 | | |
| A-2 | 11.7 | 2.3 | 217 | B-4420 | B-4400 | B-59 | B-2.7 | | |
| | | | | P-4480 | P-4422 | P-52 | P-2.5 | 5.1 | |
| | | | | $^S$MD-3450 | $^S$MD-3130 | $^S$MD-50 | $^S$MD-1.7 | | |
| | | | | AMD-3600 | AMD-3090 | AMD-49 | AMD-1.6 | | |
| A-3 | 12.8 | 3.2 | 215 | P-4400 | P-4400 | P-49 | P-2.2 | | |
| | | | | $^S$MD-3420 | $^S$MD-3240 | $^S$MD-52 | $^S$MD-1.6 | | |
| | | | | AMD-3460 | AMD-3140 | AMD-54 | AMD-1.5 | | |
| A-4 | 17.1 | 2.6 | 215 | P-4636 | P-4520 | P-50 | P-2.2 | | |
| | | | | $^S$MD-3820 | $^S$MD-3320 | $^S$MD-48 | $^S$MD-1.5 | | |
| | | | | AMD-3900 | AMD-3220 | AMD-44 | AMD-1.5 | | |
| A-5 | 17.1 | 2.4 | 214 | P-4640 | P-4420 | P-47 | P-2.4 | | |
| | | | | $^S$MD-3830 | $^S$MD-3230 | $^S$MD-45 | $^S$MD-1.6 | | |
| | | | | AMD-3850 | AMD-3170 | AMD-50 | AMD-1.6 | | |
| Replicate Tests of A-5 | | | | | | P-50 | P-2.5 | | |
| | | | | | | $^S$MD-49 | $^S$MD-1.4 | | |
| | | | | | | AMD-45 | AMD-1.3 | | |
| A-6 | 20.6 | 1.8 | 216 | P-5100 | P-4700 | P-37 | P-3.0 | | |
| | | | | $^S$MD-3370 | $^S$MD-4190 | $^S$MD-39 | $^S$MD-1.4 | | |
| | | | | AMD-3390 | AMD-4270 | AMD-445 | AMD-1.3 | | |
| A-7 | 20.6 | 2.5 | 218 | P-4700 | P-4520 | P-53 | P-2.2 | | |
| | | | | $^S$MD-3870 | $^S$MD-3210 | $^S$MD-40 | $^S$MD-1.6 | 3.0 | 14.3 |
| | | | | AMD-3960 | AMD-3180 | AMD-39 | AMD-1.6 | | |
| A-8 | 9.6 | 2.8 | 214 | P-4412 | P-4308 | P-47 | P-2.2 | | |
| | | | | $^S$MD-3633 | $^S$MD-3080 | $^S$MD-45 | $^S$MD-1.6 | 3.7 | 21 |
| | | | | AMD-3720 | AMD-3110 | AMD-51 | AMD-1.6 | | |

TABLE III

| Resin | % Vinyl | Flow Rate | Vicat °F. | Tensile @ Yield | Resin Series B 5.44% Rubber Tensile @ Failure | Elongation @ Failure | Izod Impact Room Temp., Notched .125 Thick Samples | RPS Wgt. Avg. | Swelling Index Dry Weights |
|---|---|---|---|---|---|---|---|---|---|
| B-1 | 9.6 | 2.5 | 216 | | P-4740 $S$MD-4620 AMD-4210 | B-27 B-34 $S$MD-2 AMD-2 | B-.9 P-.8 $S$MD-.7 AMD-.6 | 1.0 | |
| B-2 | 9.6 | 3.8 | | | P-4360 $S$MD-3392 AMD-3456 | B-41 P-49 $S$MD-52 AMD-58 | B-1.3 P-2.0 $S$MD-1.0 AMD-1.0 | (1.7–3.0) | 19–22 |
| B-3 | 7.9 | 3.3 | 216 | P-4740 $S$MD-3880 AMD-4020 | P-4140 $S$MD-2970 AMD-2960 | P-38 $S$MD-45 AMD-41 | P-2.5 $S$MD-1.8 AMD-1.9 | 2.5 | 22.1 |
| B-4 | 12.0 | 3.5 | 218 | P-5200 $S$MD-4780 AMD-4810 | P-4320 $S$MD-3370 AMD-3810 | P-39 $S$MD-20 AMD-6 | P-1.3 $S$MD-1.1 AMD-1.0 | 3.0 | 15.5 |
| B-5 | 14.3 | 4.0 | 215 | P-5380 $S$MD-4910 AMD-5040 | P-4440 $S$MD-3450 AMD-4010 | P-38 $S$MD-15 AMD-7 | P-1.3 $S$MD-1.1 AMD-1.0 | 1.0 | 14.4 |

The physical properties measured on samples taken from bead (B), pellet (P) or sheet (S) forms of the resins are shown in Tables I and III. The sheet materials are 0.125 inches thick. This also shows the influence of melt processing of resins on the measured physical properties. Table II illustrates the effect from repeated repelletization of the resin materials and extrusion into sheet form; this simulates the recycling of resin materials trimmed from fabricated items which may typically be used in amounts up to 50% by weight of the total resin being processed.

The particle size of the dispersed insoluble particle phase in the impact polystyrene resin in the Examples is within the range of 1.0–6.0 microns. Preferably it is within the range of 1.5 to 4.0 microns. For a given resin formulation, the particle size attained is for an optimum balance between gloss and impact strength under the particular polymerization conditions and agitation conditions employed. The Swelling Index measured by dry weights is in the range of 5 to 25. Even if the resin particle size and Swelling Index are as described above, as illustrated in Tables I and III, the impact strength, elongation and tensile strengths of impact polystyrene resin compositions can be very poor unless the principles of this invention are followed.

In the examples A-1 to A-7, the polybutadiene rubber had about 0.18% by weight of butylated hydroxy toluene and a small amount of substituted para-phenylene diamine as stabilizers. A-8 represents a typical impact polystyrene resin made from a polybutadiene rubber in which the vinyl content is 9.6%. As shown, the range of melt indices is given as Flow rate and is satisfactory for extrusion of these resins. The Izod impact, Elongation at Failure and Tensile strength at Failure for A-1 to A-7 illustrate that the resins made from the corresponding rubbers have achieved an effective modification of the polymerized styrene matrix with the small insoluble particles and that the overall general physical properties are at least as good as the resin of A-8. The extruded sheets were smooth and had good uniformity in thickness (gage control). The change in physical properties between bead, pellet and sheet samples is consistent. The isotropic nature of the sheet materials is shown by the MD (sample in direction of extrusion) and AMD (sample perpendicular to direction of extrusion) values. The difference between these values is less than 15% for both Izod impact strength and Elongation at Failure. Tensile strength at Break also comes within this range. The Tensile strengths at Yield reflect the initial deformation of the resin sample and occur at elongations on the order of 2%. The combination of tensile strength at Yield and at Failure and Elongation at Failure demonstrates effective and efficient modification of the polymerized styrene matrix. Particularly, the physical properties of the samples from extruded sheets, show that the resins described above can be used for extrusion fabrication. The resistance to insoluble particle breakdown during melt processing is considered to arise from the relatively higher vinyl content in the polybutadiene rubber used in the polymerization for forming the impact resins. Resins A-6 and A-7 show the start of significant changes in lowering Izod impact strength and elongation at failure and corresponding increasing tensile strengths that would give unsatisfactory products. Because the rubber used in A-6 and A-7 has 20.6% vinyl, and from the counterpart effects noted for Table III, it is seen that the upper limit for vinyl content to achieve satisfactory resins is with a polybutadiene rubber having about 22% vinyl content.

In Table II, the stability on melt processing is illustrated from the properties of recycled resin from sheet samples. The resin types are those of A-3, A-6 and A-8 of Table I. Extruded sheet was melted and re-extruded four successive times. The Tensile strength, elongation and Izod impact strength after each extrusion run was measured. The physical properties are remarkably constant between the successive extruded samples including the isotropic properties of the sheets. Resin A-6 shows the beginning of lowering of Izod impact strengths which arise from reaching the maximum useful vinyl content in the polybutadiene rubbers. This stability of the resins shows the adequacy of the resin compositions against shear and heat degradation.

In Table III, Resins B-1 through B-5 show the effect of the vinyl content of the rubber and the stabilization additives on the resin properties under the polymerization conditions used for the resins in Table A. In resin B-1, the polybutadiene rubber had no stabilizer or antioxidants. There is a substantial loss in Izod impact strength, a substantial loss in elongation at failure (particularly acute in the samples from sheet), a large and persistent increase in tensile strength at yield and a substantial increase in resistance to flow (shown as flow rate). Resin B-2 is a grade for extrusion or injection molding analogous to resin A-6; the polybutadiene rubber contained about 0.18% butylated hydroxy toluene and a small amount of the substituted para-phenylene diamine. Resins B-3 through B-5 were made from a polybutadiene rubber than contained butylated hydroxy toluene and an alkyl aryl phosphite. The flow rate, elongation at failure, tensile strength at break (failure), tensile strength at yield, Izod impact strength and isotropic sheet properties for resins B-2 and B-3 are substantially the same. Resins B-4 and B-5 were made from polybutadiene rubbers having the same additives as those in the rubber used for resin B-3. The physical properties for resins B-4 and B-5 show substantial losses in Izod impact strength and elongation at yield and also a large increase in Tensile strength. Moreover, the sheet samples show substantial anisotropy. It should be noted that the insoluble particle size range and swelling index for the resins in Table III are all within the normally accepted ranges for conventional impact polystyrene resins. The steep decrease in values of physical properties between the resins B-2 and B-3, and the resins B-1, B-4 and B-5 demonstrate the sensitivity of the resin properties to polymerization conditions and ingredients used along with the polybutadiene rubber and the styrene monomer.

In addition to the foregoing, it has also been observed that the presence of active oil soluble peroxide catalysts in the thermal polymerization stage causes resins made under the conditions described above to show extensive graft copolymerization which interferes with the phase inversion and also causes loss of definition of the identity of the dispersed insoluble particles. Furthermore, when substantial temperature variations along reactor side walls exist, those regions having substantially higher temperatures than those used above show the formation of insoluble gel like masses during the thermal polymerization for resins such as those in A-8 and B-2.

The resin compositions of this invention also have utility in the same manner as conventional impact polystyrene resins. These compositions may be blended with crystal polystyrene resins to form medium impact polystyrene resins. Likewise, the resins may be colored with pigments. In addition to deep draw thermoforming and injection molding of thin-walled articles, the resins compositions may be co-extruded with other plastics materials. Foamed resin articles may be made by foaming of molten resin with injection of expansion agents or by foaming particles of the resin composition that contain expansion agents. Auxiliary operations such as trimming, punching or stamping fabricated articles as well as printing, painting or adhesive coating can be performed.

This invention has provided high impact polystyrene resins with outstanding physical properties. These are particularly useful in fabrication of plastic articles by molding or extrusion. While the invention has been described above in terms of specific conditions and materials, it is distinctly understood it is intended to include variations in polymerization formula, polymerizable materials, polymerization conditions and practices as would be considered equivalent by those skilled in the art.

I claim:

1. A thermoplastic resin composition capable of being extruded into thin sheet comprising:

an impact polystyrene material containing a minor amount of a high boiling plasticizer having melt toughness during extrusion and consisting essentially of a matrix of polymerized styrene containing a dispersed phase of insoluble particles, said particles having a matrix of polybutadiene rubber and at least one dispersed phase of polymerized styrene, said insoluble particles having styrene-polybutadiene graft copolymer linkages and also containing cross-linked polybutadiene rubber, said material being made by the polymerization of styrene with at least one polybutadiene rubber, said rubber about 4 to about 10% by weight of said styrene, the room temperature Izod impact strength of said material being at least 0.9 ft.-lb/in, the swelling index of said particles being in the range of 5 to 30, said particles having a weight average size in the range of 1–10 microns, said material being characterized in that said polybutadiene rubber has a distribution of polymerized butadiene isomer in the form of 19 to 22% vinyl, the balance being cis and trans 1,4 structures, said material being further characterized by values of elongation at failure of at least 35% and corresponding tensile strength at failure of at least 2,000 psi, said values being computed on the basis of measurements performed at room temperature on extruded sheet samples in the direction of extrusion and orientations perpendicular to said direction of extrusion, said sheet samples being isotropic such that the minimum of said values is at least 60% of the larger value obtained from the respective orientations.

* * * * *

UNITED STATES PATENT AND TRADEMARK OFFICE
CERTIFICATE OF CORRECTION

PATENT NO. : 4,312,802
DATED : 1/26/82
INVENTOR(S) : Harry D. Anspon

It is certified that error appears in the above-identified patent and that said Letters Patent are hereby corrected as shown below:

Column 3, line 49, insert --$R_1$-- and --$R_2$-- on the nitrogen atoms of the chemical structure.

Column 5, line 42, change "7" to --1--.

In Table I, Resin A-6, under "Elongation at Failure" column, "AMD-445" should be --AMD-45--.

Column 10, line 42, change "has" to --had--.

Column 11, line 8, change "than" to --that--.

Signed and Sealed this

Twenty-second Day of June 1982

[SEAL]

Attest:

Attesting Officer

GERALD J. MOSSINGHOFF

Commissioner of Patents and Trademarks